United States Patent
Hwang et al.

(10) Patent No.: US 12,451,100 B2
(45) Date of Patent: Oct. 21, 2025

(54) MOBILITY DETECTION METHOD AND APPARATUS, COMPUTER DEVICE

(71) Applicant: SHENZHEN CHINA STAR OPTOELECTRONICS SEMICONDUCTOR DISPLAY TECHNOLOGY CO., LTD., Guangdong (CN)

(72) Inventors: Taijiun Hwang, Guangdong (CN); Yuchao Zeng, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/623,797

(22) PCT Filed: Dec. 27, 2021

(86) PCT No.: PCT/CN2021/141471
§ 371 (c)(1),
(2) Date: Jun. 22, 2023

(87) PCT Pub. No.: WO2023/108806
PCT Pub. Date: Jun. 22, 2023

(65) Prior Publication Data
US 2024/0371341 A1    Nov. 7, 2024

(30) Foreign Application Priority Data
Dec. 15, 2021 (CN) .......................... 202111561083.8

(51) Int. Cl.
*G09G 5/00* (2006.01)
*G06F 3/14* (2006.01)

(52) U.S. Cl.
CPC .......... *G09G 5/006* (2013.01); *G06F 3/1407* (2013.01); *G09G 2310/08* (2013.01); *G09G 2340/0435* (2013.01)

(58) Field of Classification Search
CPC ............... G09G 5/006; G09G 2310/08; G09G 2340/0435; G06F 3/1407; G06F 3/14; Y02D 30/70
(Continued)

(56) References Cited

U.S. PATENT DOCUMENTS

2001/0055337 A1* 12/2001 Matsuzaki ............. H04N 19/15
                                                                 375/E7.22
2017/0359549 A1* 12/2017 Baran .................... H04N 5/772
(Continued)

FOREIGN PATENT DOCUMENTS

| CN | 104637440 A | 5/2015 |
| CN | 104715720 A | 6/2015 |

(Continued)

OTHER PUBLICATIONS

International Search Report in International application No. PCT/CN2021/141471, mailed on Jun. 24, 2022.
(Continued)

*Primary Examiner* — James A Thompson
*Assistant Examiner* — Kim Thanh T Tran
(74) *Attorney, Agent, or Firm* — PV IP PC; Wei Te Chung

(57) ABSTRACT

A mobility detection method and apparatus, and a computer device are disclosed. The method includes: using a predetermined consecutive picture frames as an adjustment group, and setting a detection frame and an adjustment frame; extending a frame idle time of the detection frame, so that the frame idle time of the detection frame is correspondingly reduced; and performing mobility detection during the frame
(Continued)

idle time of the detection frame. In this way, the current problem that the frame idle time does not satisfy the time required for the mobility detection when the frame rate is excessively high is resolved.

20 Claims, 5 Drawing Sheets

(58) Field of Classification Search
USPC .......................................................... 345/520
See application file for complete search history.

(56) References Cited

U.S. PATENT DOCUMENTS

| | | | |
|---|---|---|---|
| 2018/0068610 A1* | 3/2018 | Cho | .......................... G09G 3/32 |
| 2018/0174551 A1 | 6/2018 | Ansari | |
| 2020/0152154 A1* | 5/2020 | Chu | ..................... G09G 3/2003 |

FOREIGN PATENT DOCUMENTS

| | | |
|---|---|---|
| CN | 111629263 A | 9/2020 |
| CN | 112599087 A | 4/2021 |

OTHER PUBLICATIONS

Written Opinion of the International Search Authority in International application No. PCT/CN2021/141471, mailed on Jun. 24, 2022.

* cited by examiner

MOBILITY DETECTION METHOD AND APPARATUS, COMPUTER DEVICE

FIELD OF INVENTION

The present disclosure relates to the display field, and in particular, to a mobility detection method and apparatus, and a computer device.

BACKGROUND OF INVENTION

When the active matrix organic light-emitting diode (AMOLED) device displays, the temperature of the thin film transistor (TFT) in the panel is related to the display brightness and the ambient temperature, which causes the mobility of the TFT to change. The current solution is to detect and compensate for the mobility of the TFT in real time.

The method of real-time detection of the mobility of the TFT is usually to detect the mobility of the TFT of a row of sub-pixels in the idle state of each picture frame without refreshing the display screen, and update the mobility compensation data of the TFT in the frame display state. However, as the frame rate of the display screen becomes higher, the frame idle time of each frame decreases, which may not satisfy the detection time required for the mobility detection of the TFT.

SUMMARY OF INVENTION

Technical Problem

Embodiments of the present disclosure provide a mobility detection method and apparatus, and an electronic device, so as to resolve the problem in the prior art that the frame idle time does not satisfy the detection time required for the mobility detection of the thin film transistor (TFT) when the frame rate is excessively high.

Technical Solution

Other features and advantages of the present disclosure become obvious through the following detailed descriptions, or may be partially learned partially through the practice of the present disclosure.

According to one aspect of the embodiments of the present disclosure, a mobility detection method is provided, applicable to a display device and including: using a first predetermined number of consecutive picture frames as an adjustment group, selecting a picture frame from the adjustment group and denoting the picture frame as a detection frame, and denoting the picture frames in the adjustment group except the detection frame as adjustment frames; extending a frame idle time of the detection frame by a predetermined increment time, so that the frame idle time of the detection frame is greater than a predetermined detection time threshold; reducing a frame idle time of each of the adjustment frames by a predetermined decrement time, wherein a sum of the predetermined decrement times of the adjustment frames is equal to the predetermined increment time; and detecting, in a frame idle phase of the detection frame, mobility information of at least one row of sub-pixel points of the display device.

Optionally, after the using a first predetermined number of consecutive picture frames as an adjustment group, selecting a picture frame from the adjustment group and denoting the picture frame as a detection frame, and denoting the picture frames in the adjustment group except the detection frame as adjustment frames, and before the extending a frame idle time of the detection frame by a predetermined increment time, so that the frame idle time of the detection frame is greater than a predetermined detection time threshold, the method further includes: caching a second predetermined number of consecutive picture frames.

Optionally, before the using a first predetermined number of consecutive picture frames as an adjustment group, and selecting a picture frame from the adjustment group as a detection frame, the method further includes: acquiring a current frame rate of the display device; and determining the first predetermined number according to the frame rate.

Optionally, the determining the first predetermined number according to the frame rate includes: determining an average frame idle time according to the frame rate; determining a first difference and a second difference, wherein the first difference is a difference between the average frame idle time and a predetermined idle time, and the second difference is a difference between the predetermined detection time threshold and the average frame idle time; and determining the first predetermined number according to the first difference and the second difference.

Optionally, before the using a first predetermined number of consecutive picture frames as an adjustment group, and selecting a picture frame from the adjustment group as a detection frame, the method further includes: acquiring a current frame rate of the display device; and determining the predetermined increment time according to the frame rate.

Optionally, the determining the predetermined increment time according to the frame rate includes: determining an average frame idle time according to the frame rate; and determining the predetermined increment time according to a difference between the predetermined detection time threshold and the average frame idle time.

Optionally, the determining the predetermined increment time according to the frame rate includes: determining the predetermined increment time according to a linear positive correlation between the frame rate and the predetermined increment time.

According to one aspect of the embodiments of the present disclosure, a mobility detection apparatus is provided, applicable to a display device and including: a preprocessing module configured to use a first predetermined number of consecutive picture frames as an adjustment group, select a picture frame from the adjustment group and denote the picture frame as a detection frame, and denote the picture frames in the adjustment group except the detection frame as adjustment frames; a first adjustment module configured to extend a frame idle time of the detection frame by a predetermined increment time, so that the frame idle time of the detection frame is greater than a predetermined detection time threshold; a second adjustment module configured to reduce a frame idle time of each of the adjustment frames by a predetermined decrement time, wherein a sum of the predetermined decrement times of the adjustment frames is equal to the predetermined increment time; and an information detection module configured to detect, in a frame idle phase of the detection frame, mobility information of at least one row of sub-pixel points of the display device.

Optionally, the mobility detection apparatus further includes: a frame caching module configured to cache a second predetermined number of consecutive picture frames.

Optionally, the mobility detection apparatus further includes: a frame rate acquisition module configured to acquire a current frame rate of the display device; and a frame number determination module configured to determine the first predetermined number according to the frame rate.

Optionally, the frame number determination module includes: a time determination unit configured to determine an average frame idle time according to the frame rate; a difference determination unit configured to determine a first difference and a second difference, wherein the first difference is a difference between the average frame idle time and a predetermined idle time, and the second difference is a difference between the predetermined detection time threshold and the average frame idle time; and a frame number determination unit configured to determine the first predetermined number according to the first difference and the second difference.

Optionally, the mobility detection apparatus further includes: a frame rate acquisition module configured to acquire a current frame rate of the display device; and an increment determination module configured to determine the predetermined increment time according to the frame rate.

Optionally, the increment determination module includes: a time determination unit configured to determine an average frame idle time according to the frame rate; and an increment determination unit configured to determine the predetermined increment time according to a difference between the predetermined detection time threshold and the average frame idle time.

Optionally, the increment determination module includes: an increment calculation unit configured to determine the predetermined increment time according to a linear positive correlation between the frame rate and the predetermined increment time.

According to one aspect of the embodiments of the present disclosure, the present disclosure further provides a computer device. The computer device includes:
one or more processors;
a memory; and
one or more applications stored in the memory and configured to be executed by the processors to perform following steps:
using a first predetermined number of consecutive picture frames as an adjustment group, selecting a picture frame from the adjustment group and denoting the picture frame as a detection frame, and denoting the picture frames in the adjustment group except the detection frame as adjustment frames;
extending a frame idle time of the detection frame by a predetermined increment time, so that the frame idle time of the detection frame is greater than a predetermined detection time threshold;
reducing a frame idle time of each of the adjustment frames by a predetermined decrement time, wherein a sum of the predetermined decrement times of the adjustment frames is equal to the predetermined increment time; and detecting, in a frame idle phase of the detection frame, mobility information of at least one row of sub-pixel points of the display device.

Optionally, after using a first predetermined number of consecutive picture frames as an adjustment group, selecting a picture frame from the adjustment group and denoting the picture frame as a detection frame, and denoting the picture frames in the adjustment group except the detection frame as adjustment frames, and before the extending a frame idle time of the detection frame by a predetermined increment time, so that the frame idle time of the detection frame is greater than a predetermined detection time threshold, the method further performs:
caching a second predetermined number of consecutive picture frames.

Optionally, before using a first predetermined number of consecutive picture frames as an adjustment group, and selecting a picture frame from the adjustment group as a detection frame, the method further performs:
acquiring a current frame rate of the display device; and
determining the first predetermined number according to the frame rate.

Optionally, determining the first predetermined number according to the frame rate, the processor performs following steps:
determining an average frame idle time according to the frame rate;
determining a first difference and a second difference, wherein the first difference is a difference between the average frame idle time and a predetermined idle time, and the second difference is a difference between the predetermined detection time threshold and the average frame idle time; and
determining the first predetermined number according to the first difference and the second difference.

Optionally, before using a first predetermined number of consecutive picture frames as an adjustment group, and selecting a picture frame from the adjustment group as a detection frame, the processor performs following steps:
acquiring a current frame rate of the display device; and
determining the predetermined increment time according to the frame rate.

Optionally, determining the predetermined increment time according to the frame rate, the processor performs following steps:
determining an average frame idle time according to the frame rate;
determining the predetermined increment time according to a difference between the predetermined detection time threshold and the average frame idle time.

Beneficial Effects

In the technical solutions provided in some embodiments of the present disclosure, the plurality of consecutive picture frames are used as an adjustment group, the picture frame is selected from the adjustment group, and the frame idle time of the detection frame is extended by the predetermined increment time, so that the frame idle time of the detection frame is greater than a predetermined detection time threshold, so as to perform mobility detection during the frame idle time of the detection frame. In this way, the problem in the prior art that the frame idle time does not satisfy the detection time required for the mobility detection of the TFT when the frame rate is excessively high is resolved.

It is to be understood that, the foregoing general descriptions and the following detailed descriptions are merely for illustration and explanation purposes and are not intended to limit the present disclosure.

BRIEF DESCRIPTION OF DRAWINGS

To describe technical solutions in embodiments of the present disclosure more clearly, the following briefly introduces the accompanying drawings required for describing the embodiments. Apparently, the accompanying drawings in the following description show only some embodiments of the present disclosure, and a person skilled in the art may still derive other accompanying drawings from these accompanying drawings without creative efforts.

DETAILED DESCRIPTION OF PREFERRED EMBODIMENTS

Figure 1:
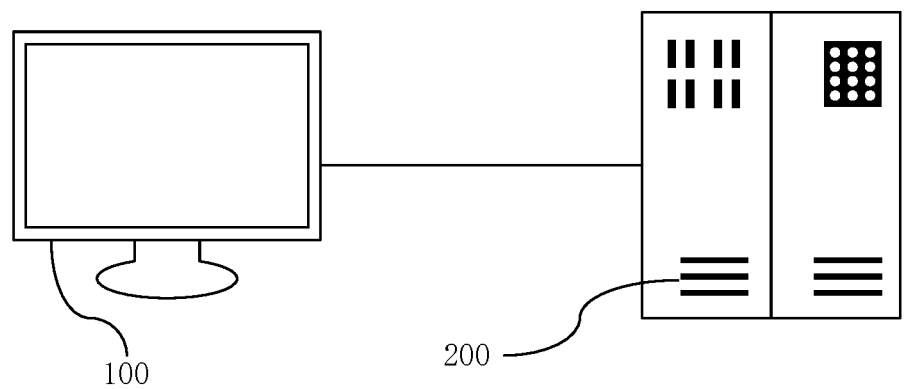
FIG. 1 is an implementation environment diagram of a mobility detection method according to an embodiment.

The technical solutions in the embodiments of the present disclosure are clearly and completely described in the following with reference to the accompanying drawings in the embodiments of the present disclosure. Apparently, the embodiments to be described are merely some embodiments of the present disclosure rather than all of the embodiments. All other embodiments obtained by a person skilled in the art based on the embodiments of the present disclosure without creative efforts shall fall within the protection scope of the present disclosure. In addition, it should be understood that the specific implementations described herein are merely used for describing and illustrating the present disclosure rather than limiting the present disclosure. In the present disclosure, without the contrary explanation, the directional terms such as "upper" and "lower" are usually used to refer to the top and bottom of the device in actual use or operating condition, specifically refer to the orientation of the drawing in the accompanying drawings; and "inside" and "outside" refer to the inside and outside of the contour of the corresponding component.

Embodiments of the present disclosure provide a mobility detection method and apparatus, a computer device, and a storage medium. Detailed descriptions are given below. The description sequence of the following embodiments is not intended to limit preference orders of the embodiments.

To make the objectives, technical solutions and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

FIG. 1 is an implementation environment diagram of a mobility detection method according to an embodiment. As shown in FIG. 1, the implementation environment includes a screen assembly 100 and an electronic control assembly 200.

The screen assembly 100 is a module that is installed in any device requiring a display interface and provides a display interface for the device. The screen assembly 100 may be installed in mobile terminals, wearable devices, displays, household appliances, machine tools, robots, and various other devices that require the display interfaces. The electronic control assembly 200 is a module used by a user to control the screen assembly 100. The electronic control assembly may be an electronic control board, a central processing unit (CPU), a system on chip (SoC), and the like, may acquire various parameters of the screen assembly 100, and may control an operating state of the screen assembly 100.

During use, the electronic control assembly 200 uses a first predetermined number of consecutive picture frames as an adjustment group, selects a picture frame from the adjustment group as a detection frame, and extends, by a predetermined increment time, a frame idle time of the screen assembly 100 to display the detection frame, so that the frame idle time of the detection frame is greater than a predetermined detection time threshold. Finally, in a frame idle phase of the detection frame, mobility information of at least one row of sub-pixel points of the screen assembly 100 is acquired.

It should be noted that the electronic control assembly 200 may be connected to the screen assembly 100 using a wired mode, a wireless mode, or other communication connection modes, and the present invention is not limited herein.

Figure 2:
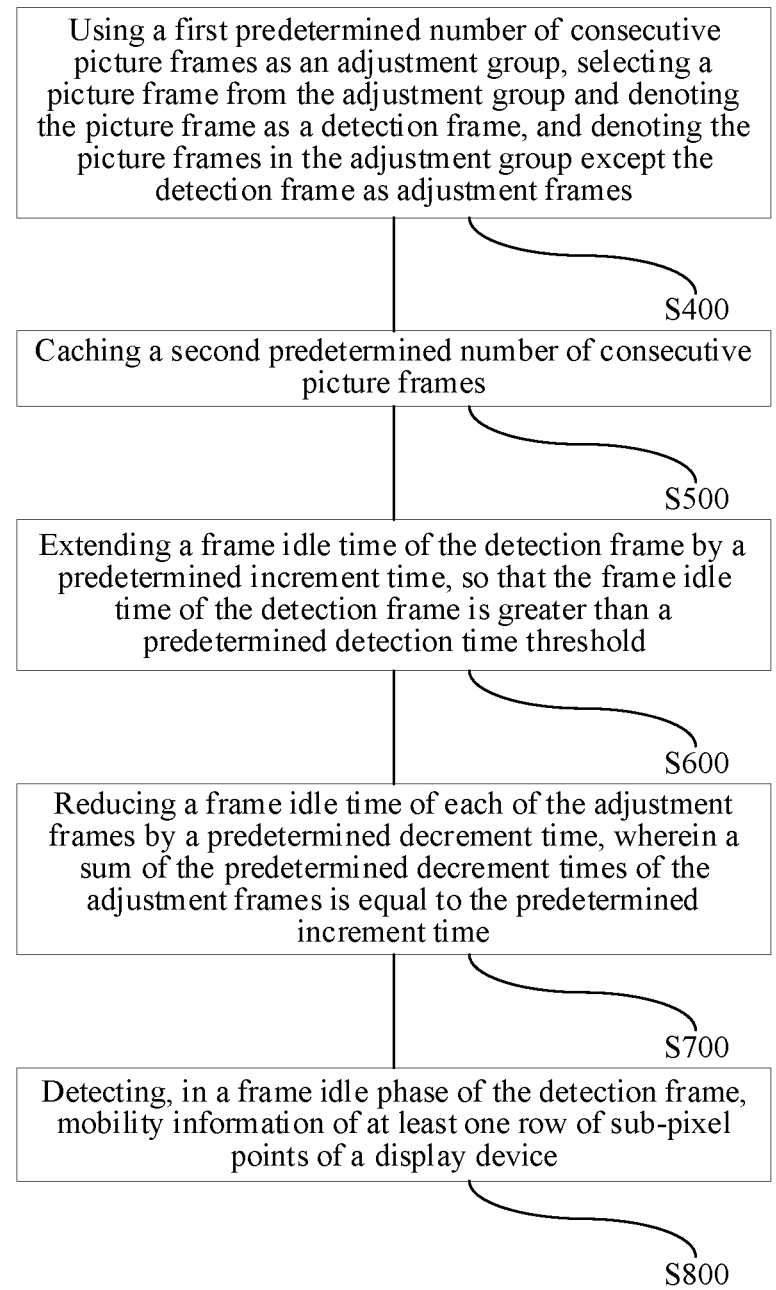
FIG. 2 is a flowchart of a mobility detection method according to an exemplary embodiment.

As shown in FIG. 2, in an embodiment, a mobility detection method is provided. The mobility detection method may be applicable to the above electronic control assembly 200, and may include steps below in detail.

Step S400: Using a first predetermined number of consecutive picture frames as an adjustment group, selecting a picture frame from the adjustment group and denoting the picture frame as a detection frame, and denoting the picture frames in the adjustment group except the detection frame as adjustment frames.

Step S600: Extending a frame idle time of the detection frame by a predetermined increment time, so that the frame idle time of the detection frame is greater than a predetermined detection time threshold.

Step S700: Reducing a frame idle time of each of the adjustment frames by a predetermined decrement time, wherein a sum of the predetermined decrement times of the adjustment frames is equal to the predetermined increment time.

Step S800: Detecting, in a frame idle phase of the detection frame, mobility information of at least one row of sub-pixel points of a display device.

In the embodiment of the present disclosure, the picture frames of a video stream are first divided into several adjustment groups, and each adjustment group includes a first predetermined number of consecutive picture frames. A picture frame is selected from each adjustment group as the detection frame, and then other picture frames in the adjustment group are used as the adjustment frames. When the screen assembly 100 displays the adjustment frame, the frame idle time of the adjustment frame is reduced, so that the sum of the predetermined decrement times of the adjustment frames in the adjustment group is equal to the predetermined increment time. When the screen assembly 100 displays the detection frame, the frame idle time of the detection frame is extended, so that the frame idle time of the detection frame is greater than the predetermined detection time threshold. In the frame idle phase of the detection frame, mobility detection is performed, to acquire mobility information of at least one row of sub-pixel points of the screen assembly 100.

In the present disclosure, the detection frame is selected from the picture frames of the video stream, and then the frame idle time of the detection frame is extended to make the frame idle time sufficient for mobility detection. In this way, the problem in the prior art that the frame idle time does not satisfy the detection time required for the mobility detection of the TFT when the frame rate is excessively high is resolved. In addition, in addition to extending the frame idle time of the detection frame, the present disclosure further correspondingly reduces the frame idle time of the adjustment frame to ensure that an average frame rate of the adjustment group remains same as before the adjustment, so as to ensure the stability of the display frame rate of the screen assembly 100.

The above predetermined detection time threshold is greater than or equal to the time required to detect the mobility of a row of sub-pixels. The predetermined detection time threshold may be the time required to detect the mobility of a row of sub-pixels, or may be a time required to detect mobility of a row of pixels, and may further be a time required to detect mobility of a plurality of rows of sub-pixels or pixels, which is not limited in the present disclosure. In addition, in order to ensure a sufficient detection time, the frame idle time of the detection frame is greater than the predetermined detection time threshold, so as to leave a certain amount of time redundancy.

The selection of the above detection frame may be to select the first picture frame of each adjustment group, or select a last picture frame of each adjustment group, or select a certain picture frame in the middle of each adjustment group. The present disclosure is not limited herein. In the subsequent embodiments of the present disclosure, the last picture frame of each adjustment group is selected as the detection frame for description.

After step S800 is performed, the electronic control assembly 200 updates the mobility information of the display device according to the detection result. In the frame display phase of each picture frame, mobility compensation is performed on each sub-pixel point of the display device according to the updated mobility information.

In the present embodiment, in the frame display phase of each picture frame, the mobility compensation is performed on each sub-pixel point of the display device. If the current picture is displayed as the picture of the adjustment frame, the mobility compensation is performed on each sub-pixel point of the display device according to the updated mobility information of the previous adjustment group, and after the detection frame, the mobility information is updated according to the detection result.

In the embodiments of the present disclosure, in detail, in some embodiments, after step S400 and before step S600, the method further includes the step below.

Step S500: Caching a second predetermined number of consecutive picture frames.

Before the frame idle time of the picture frames in the adjustment group is adjusted, frame caching requires to be performed first, so that the frame idle time of each picture frame can be adjusted in the subsequent steps. More cached picture frames lead to easier adjustment of the frame idle time of each picture frame, but if there are too many cached picture frames, higher video memory is required, which increases the cost of materials.

In the present embodiment, it is necessary to cache at least one picture frame and at most the first predetermined number of frames. That is to say, the second predetermined number is greater than or equal to one and less than or equal to the first predetermined number.

Figure 3:
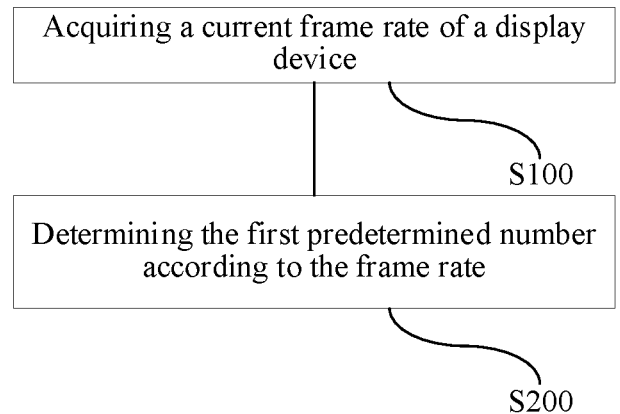
FIG. 3 is a flowchart of another mobility detection method according to an embodiment corresponding to FIG. 2.

In the embodiments of the present disclosure, there are a plurality of ways to determine the number of picture frames in the adjustment group. In detail, in some embodiments, as shown in FIG. 3, before step S400, the method further includes steps below.

Step S100: Acquiring a current frame rate of a display device.

Step S200: Determining the first predetermined number according to the frame rate.

In the present embodiment, a real-time frame rate of the screen assembly 100 of the display device is used to determine the number of picture frames in the adjustment group. The higher real-time frame rate leads to a larger number of picture frames in each adjustment group. In this way, a larger sum of times that can be reduced for all of the adjustment frames in the adjustment group leads to a longer time by which the detection frame may be extended. This ensures that a relatively short frame idle time at the high frame rate can be extended to satisfy the time required for mobility detection.

In the present embodiment, there are a plurality of ways to determine the number of picture frames in each adjustment group according to the frame rate. The number of picture frames may be determined according to a positive correlation between the frame rate and the number of frames, may be determined according to a functional relationship between the frame rate and the number of frames, or may be determined by the embodiment shown in FIG. 3.

Figure 4:
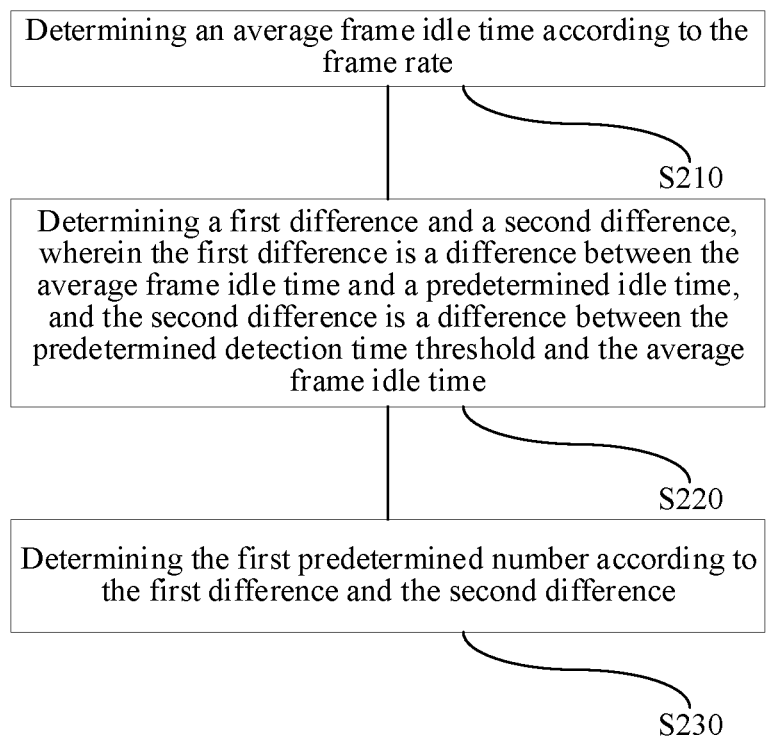
FIG. 4 is a flowchart of a detailed implementation of step S200 in a mobility detection method according to an embodiment corresponding to FIG. 3.

In detail, in some embodiments, for the detailed implementation of step S200, reference may be made to FIG. 4. FIG. 4 shows a detailed description of step S200 in a mobility detection method according to an embodiment corresponding to FIG. 3. In the mobility detection method, step S200 may include steps below.

Step S210: Determining an average frame idle time according to the frame rate.

Step S220: Determining a first difference and a second difference, wherein the first difference is a difference between the average frame idle time and a predetermined idle time, and the second difference is a difference between the predetermined detection time threshold and the average frame idle time.

Step S230: Determining the first predetermined number according to the first difference and the second difference.

In the present embodiment, the average frame idle time of the adjustment group is first determined according to the frame rate. The average frame idle time is an average frame idle time of each frame in the adjustment group. Then the first difference and the second difference are determined. The first difference is the difference between the average frame idle time and the predetermined idle time. The predetermined idle time is a shortest time required by the display device in the frame idle phase. The first difference is a maximum time variation by which the frame idle time of each adjustment frame can be reduced. The second difference is the difference between the predetermined detection time threshold and the average frame idle time, and is a minimum time variation by which the frame idle time of the detection frame requires to be extended. During the time adjustment, the time by which each adjustment frame is reduced cannot exceed the first difference, but the total time by which each adjustment frame is reduced is required to exceed the second difference. Therefore, the number of picture frames of each adjustment group may be determined according to the first difference and the second difference.

For example, in an embodiment, the frame rate is 240 Hz, and the average frame idle time is 167 µs. The shortest time required by the display device in the frame idle phase, that is, the predetermined idle time is 125 µs, and the predetermined detection time threshold is 333 µs. It can be calculated that the first difference is 42 µs and the second difference is 166 µs. It may be determined, according to the first difference and the second difference, that the number of picture frames of each adjustment group is at least 5. Generally, a smaller number of picture frames of each adjustment group leads to more sensitive detection. Therefore, in the present embodiment, the number of picture frames of each adjustment group is 5.

In other embodiments, it may also be determined according to the following formula:

$$N \geq \frac{af}{b-cf}$$

wherein N is the number of picture frames in each adjustment group, f is the frame rate of the adjustment group, a, b, and e are all constant coefficients, which are related to some parameters of the display device such as the shortest time required in the frame idle phase, the time required to perform mobility detection on a row of sub-pixels, and the like.

In one embodiment, a value of a may be 2.08, a value of b may be 400, and a value of c may be 1.25. When the frame rate of the adjustment group is 240 Hz, the number of picture frames in each adjustment group may be calculated as N≥5. That is to say, the number of picture frames in each adjustment group is at least 5. Generally, a smaller number of picture frames of each adjustment group leads to more sensitive detection. Therefore, in the present embodiment, the number of picture frames of each adjustment group is 5.

Figure 5:
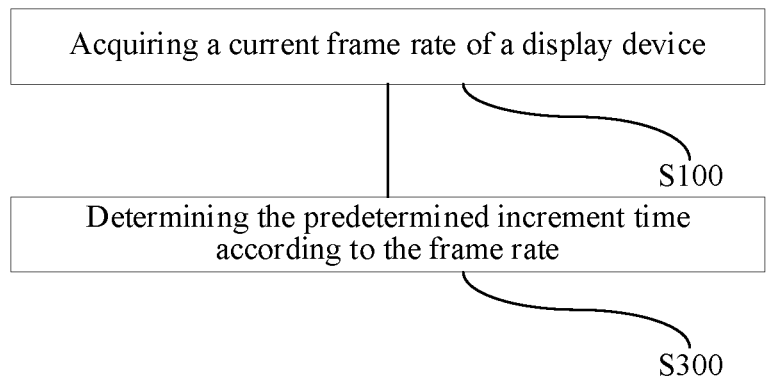
FIG. 5 is a flowchart of still another mobility detection method according to an embodiment corresponding to FIG. 2.

In the embodiments of the present disclosure, there are a plurality of ways to determine the predetermined increment time. In some embodiments of the present disclosure, as shown in FIG. 5, before step S400, the method further includes steps below.

Step S100: Acquiring a current frame rate of a display device.

Step S300: Determining the predetermined increment time according to the frame rate.

In the present embodiment, the real-time frame rate of the screen assembly 100 of the display device is used to determine the predetermined increment time by which the detection frame is to be increased. The higher real-time frame rate leads to a shorter average frame idle time per frame and a longer time by which the detection frame requires to be increased. That is to say, the frame rate and the predetermined increment time are positively correlated. The actual predetermined increment time may be determined according to the above positive correlation.

In the present embodiment, there are a plurality of ways to determine the predetermined increment time increased for the detection frame according to the frame rate. The predetermined increment time may be determined according to a positive correlation between the frame rate and the predetermined increment time, may be determined according to a functional relationship between the frame rate and the predetermined increment time, and may further be determined by the embodiment shown in FIG. 3.

Figure 6:
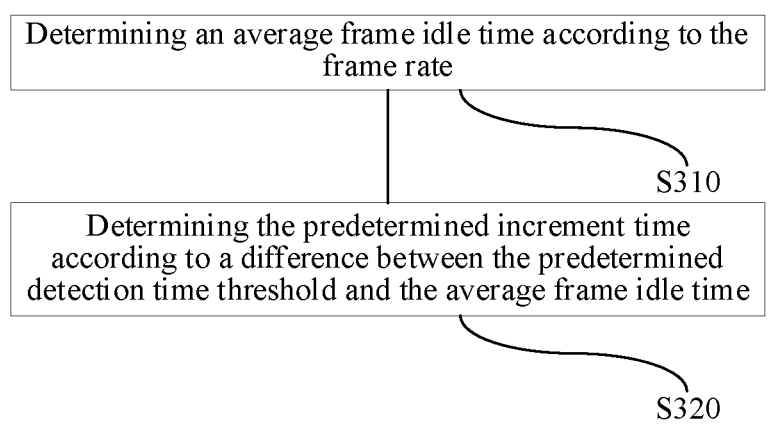
FIG. 6 is a flowchart of a detailed implementation of step S300 in a mobility detection method according to an embodiment corresponding to FIG. 5.

In detail, in some embodiments, for the detailed implementation of step S300, reference may be made to FIG. 6. FIG. 6 shows a detailed description of step S300 in a mobility detection method according to an embodiment corresponding to FIG. 5. In the mobility detection method, step S300 may include steps below.

Step S310: Determining an average frame idle time according to the frame rate.

Step S320: Determining the predetermined increment time according to a difference between the predetermined detection time threshold and the average frame idle time.

In the present embodiment, the average frame idle time of the adjustment group is first determined according to the frame rate. The average frame idle time is an average frame idle time of each frame in the adjustment group. Then the predetermined increment time is determined, and the predetermined increment time is the time added to the detection frame, which is determined by the difference between the predetermined detection time threshold and the average frame idle time.

For example, in an embodiment, the frame rate is 240 Hz, and the average frame idle time is 167 µs. The predetermined detection time threshold is 333 µs. It may be calculated that the difference between the predetermined detection time threshold and the average frame idle time is 166 µs. The predetermined increment time is at least 166 µs. Generally, a shorter predetermined increment time leads to more sensitive detection. Therefore, in the present embodiment, the predetermined increment time is 166 µs.

After the predetermined increment time is determined, the predetermined decrement time to be reduced for each adjustment frame in the adjustment group may also be determined according to the number of frames in each adjustment group. For example, in the above embodiment, if the number of frames in each adjustment group is 5, the predetermined decrement time may be obtained as 42 µs.

In other embodiments, the predetermined decrement time may also be determined according to the following formula:

$$T_n = \frac{pf - q}{Nf - f}$$

wherein $T_n$ is the predetermined decrement time, N is the number of picture frames in each adjustment group, f is the frame rate of the adjustment group, p and q are both constant coefficients, which are related to some parameters of the display device such as the time required to perform mobility detection on a row of sub-pixels, and the like.

In one embodiment, a value of p may be 3.33, and a value of q may be 400. When the frame rate of the adjustment group is 240 Hz, the predetermined increment time may be calculated as $T_p$=42 µs In the foregoing embodiment, the first predetermined number, the predetermined increment time, and the predetermined decrement time are first determined according to the frame rate of the display. The first predetermined number of consecutive picture frames are integrated as an adjustment group, a picture frame is selected from the adjustment group and denoted as a detection frame, and other picture frames are denoted as adjustment frames. Then a video picture is acquired. When the video picture is a detection frame, the frame idle time of the detection frame is extended according to the predetermined increment time, so that the frame idle time of the detection frame is greater than the predetermined detection time threshold, and in the frame idle phase of the detection frame, the mobility information of at least one row of sub-pixel points of the display device is detected and updated. When the video picture is the adjustment frame, the frame idle time of the adjustment frame is reduced according to the predetermined decrement time, so that the sum of the predetermined decrement times of the adjustment frames in the adjustment group is equal to the predetermined increment time. In addition, in the frame display phase of the picture frame, mobility compensation is performed on each sub-pixel point of the display device according to the mobility information of the previous detection.

Figure 7:
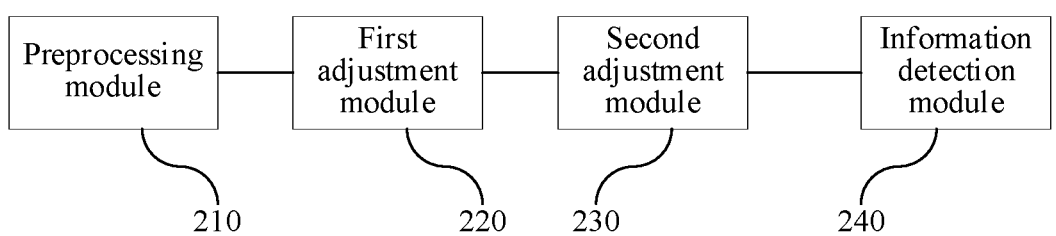
FIG. 7 is a block diagram of a mobility detection apparatus according to an exemplary embodiment.

As shown in FIG. 7, in an embodiment, a mobility detection apparatus is provided. The mobility detection apparatus may be integrated in the above electronic control assembly 200, and may include a preprocessing module 210, a first adjustment module 220, a second adjustment module 230, and an information detection module 240.

The preprocessing module 210 is configured to use a first predetermined number of consecutive picture frames as an adjustment group, select a picture frame from the adjustment group and denote the picture frame as a detection frame, and denote the picture frames in the adjustment group except the detection frame as adjustment frames.

The first adjustment module 220 is configured to extend a frame idle time of the detection frame by a predetermined increment time, so that the frame idle time of the detection frame is greater than a predetermined detection time threshold.

The second adjustment module 230 is configured to reduce a frame idle time of each of the adjustment frames by a predetermined decrement time. A sum of the predetermined decrement times of the adjustment frames is equal to the predetermined increment time.

The information detection module 240 is configured to detect, in a frame idle phase of the detection frame, mobility information of at least one row of sub-pixel points of the display device.

Optionally, the mobility detection apparatus further includes: a frame caching module configured to cache a second predetermined number of consecutive picture frames.

Optionally, the mobility detection apparatus further includes: a frame rate acquisition module configured to acquire a current frame rate of the display device; and a frame number determination module configured to determine the first predetermined number according to the frame rate.

Optionally, the frame number determination module includes: a time determination unit configured to determine an average frame idle time according to the frame rate; and a difference determination unit configured to determine a first difference and a second difference, wherein the first difference is a difference between the average frame idle time and a predetermined idle time, and the second difference is a difference between the predetermined detection time threshold and the average frame idle time; and a frame number determination unit configured to determine the first predetermined number according to the first difference and the second difference.

Optionally, the mobility detection apparatus further includes: a frame rate acquisition module configured to acquire a current frame rate of the display device; and an increment determination module configured to determine the predetermined increment time according to the frame rate.

Optionally, the increment determination module includes: a time determination unit configured to determine an average frame idle time according to the frame rate; and an increment determination unit configured to determine the predetermined increment time according to a difference between the predetermined detection time threshold and the average frame idle time.

Optionally, the increment determination module includes: an increment calculation unit configured to determine the predetermined increment time according to a linear positive correlation between the frame rate and the predetermined increment time.

Although several modules or units of a device for action execution are mentioned in the foregoing detailed descriptions, the division is not mandatory. In practice, according to the implementations of the present disclosure, the features and functions of two or more modules or units described above may be embodied in one module or unit. On the contrary, the features and functions of one module or unit described above may be further divided to be embodied by a plurality of modules or units.

In addition, although the steps of the method in the present disclosure are described in the accompanying drawings in a specific sequence, this does not require or imply that such steps need to be performed according to the specific sequence, or all shown steps need to be performed to achieve an expected result. Additionally or alternatively, some steps may be omitted, a plurality of steps may be combined into one step for execution, and/or one step may be decomposed into a plurality of steps for execution, and the like.

Through descriptions of the foregoing implementations, it is easy for a person skilled in the art to understand that the exemplary implementations described herein can be implemented by software or by combining software with necessary hardware. Therefore, the technical solutions of the implementations of the present disclosure may be implemented in the form of a software product. The software product may be stored in a non-volatile storage medium (which may be a CD-ROM, a USB flash drive, a removable hard disk, or the like) or a network and includes several instructions for instructing a computing device (which may be a personal computer, a server, a mobile terminal, a network device, or the like) to perform the methods described in the implementations of the present disclosure.

An exemplary embodiment of the present disclosure further provides an electronic device that can implement the foregoing methods.

It may be understood by a person skilled in the technical field that each aspect of the present invention may be implemented as a system, a method, or a program product. Therefore, the aspects of the present disclosure may be specifically embodied in the following forms: hardware only implementations, software only implementations (including firmware, micro code, etc.), or implementations with a combination of software and hardware, which are collectively referred to as "circuit", "module", or "system" herein.

An electronic device 500 according to an implementation of the present invention is described below with reference to FIG. 8. The electronic device 500 shown in FIG. 8 is merely an example, and should not constitute any limitation on the functions and range of use of the embodiments of the present invention.

Figure 8:
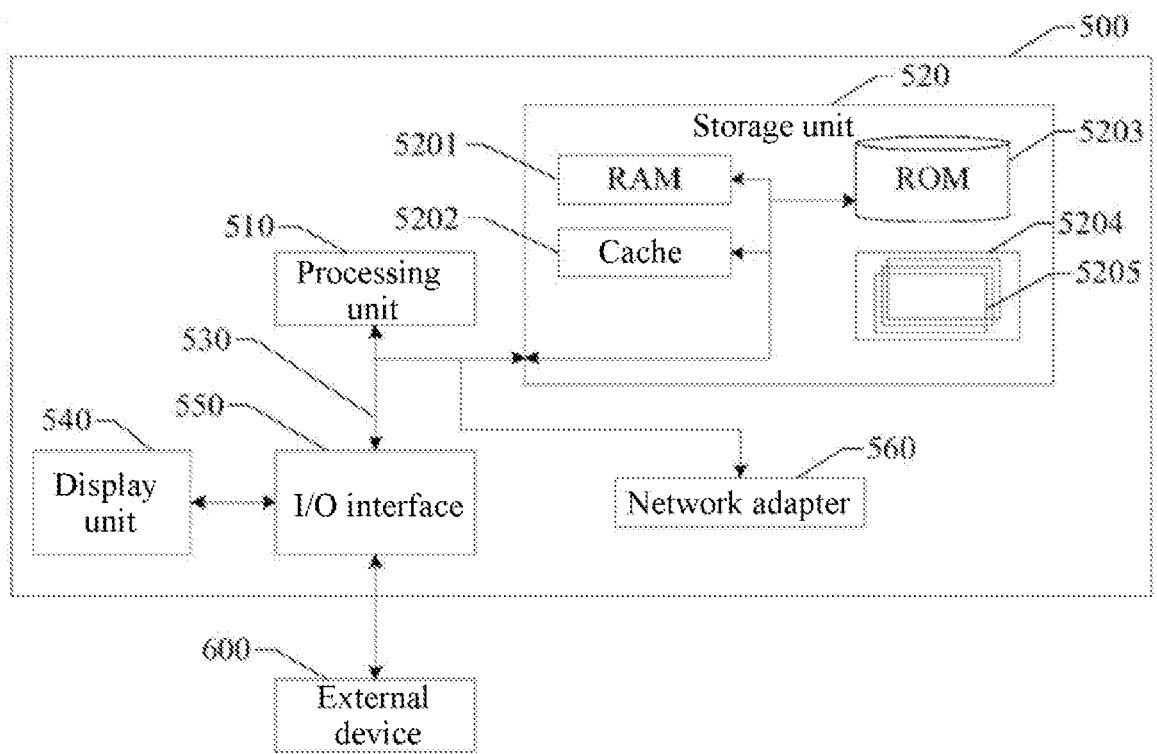
FIG. 8 schematically shows an example block diagram of an electronic device for implementing the above mobility detection method.

As shown in FIG. 8, the electronic device 500 is represented in a form of a general computing device. Components of the electronic device 500 may include, but are not limited to: the at least one processing unit 510, the at least one storage unit 520, a bus 530 connecting different system components (including a storage unit 520 and a processing unit 510), and a display unit 540.

The storage unit stores program code, and the program code may be executed by the processing unit 510, so that the processing unit 510 performs steps according to the various exemplary implementations of the present invention described in the foregoing part of "the exemplary method" of the specification. For example, the processing unit 510 may perform step S400, shown in FIG. 2, of using a first predetermined number of consecutive picture frames as an adjustment group, selecting a picture frame from the adjustment group and denoting the picture frame as a detection frame, and denoting the picture frames in the adjustment group except the detection frame as adjustment frames. Step S600: Extending a frame idle time of the detection frame by a predetermined increment time, so that the frame idle time of the detection frame is greater than a predetermined detection time threshold. Step S700: Reducing a frame idle time of each of the adjustment frames by a predetermined decrement time, wherein a sum of the predetermined decrement times of the adjustment frames is equal to the predetermined increment time. Step S800: Detecting, in a frame idle phase of the detection frame, mobility information of at least one row of sub-pixel points of a display device.

The storage unit 520 may include a readable medium in the form of a volatile storage unit, for example, a random access memory (RAM) unit 5201 and/or a cache storage unit 5202, and may further include a read-only memory (ROM) unit 5203.

The storage unit 520 may further include a program/utility 5204 having a set of (at least one) program modules 5205. Such a program module 5205 includes, but is not limited to: an operating system, one or more application programs, other program modules, and program data, and each or a combination of these examples may include implementation of a network environment.

The bus 530 may indicate one or more of several types of bus structures, including a storage unit bus or storage unit controller, a peripheral bus, an accelerated graphics port, a processing unit, or a local bus using any of a plurality of bus structures.

The electronic device 500 may also communicate with one or more external devices 600 (for example, a keyboard, a pointing device, a Bluetooth device, and the like), and may also communicate with one or more devices that enable a user to interact with the electronic device 500, and/or communicate with any device (for example, a router, a modem, and the like) that enables the electronic device 500 to communicate with one or more other computing devices. This communication may proceed through an input/output (I/O) interface 550. Moreover, the electronic device 500 may also communicate with one or more networks (for example, a local area network (LAN), a wide area network (WAN) and/or a public network such as the Internet) through a network adapter 560. As shown in the figure, the network adapter 560 may communicate with other modules of the electronic device 500 through the bus 530. It is to be understood that although not shown in the figure, other hardware and/or software modules may be used in conjunction with the electronic device 500, including, but not limited to: microcode, a device driver, a redundant processing unit, an external disk drive array, a RAID system, a tape driver, a data backup storage system, and the like.

Through descriptions of the foregoing implementations, it is easy for a person skilled in the art to understand that the exemplary implementations described herein can be implemented by software or by combining software with necessary hardware. Therefore, the technical solutions of the implementations of the present disclosure may be implemented in the form of a software product. The software product may be stored in a non-volatile storage medium (which may be a compact disc read-only memory (CD-ROM), a USB flash drive, a removable hard disk, or the like) or in a network and includes several instructions for instructing a computer device (which may be a personal computer, a server, a terminal device, a network device, or the like) to perform the methods described in the implementations of the present disclosure.

In in the exemplary embodiment of the present disclosure, a computer readable storage medium is further provided, a program product capable of implementing the foregoing method of this specification being stored thereon. In some possible implementations, each aspect of the present disclosure may be further implemented in a form of a program product including a program code. When the program product runs on a terminal device, the program code is used to enable the terminal device to perform steps according to the various exemplary implementations of the present disclosure described in the foregoing part of the "exemplary method" of the specification.

Figure 9:
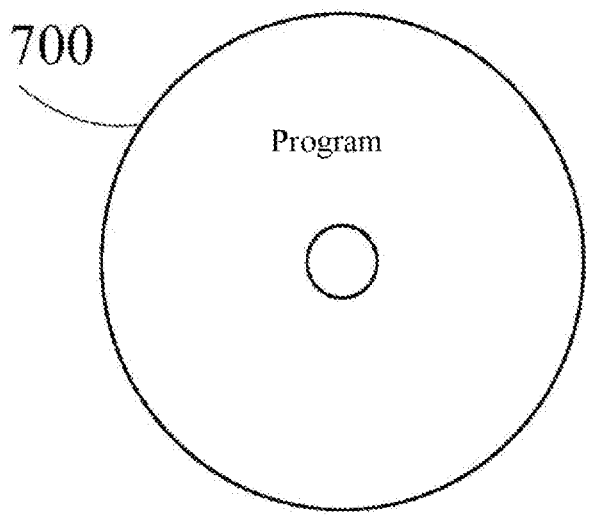
FIG. 9 schematically shows a computer-readable storage medium for implementing the above mobility detection method.

FIG. 9 describes a program product 700 configured to implement the foregoing methods according to the implementations of the present disclosure, and the program product may use a portable compact disk read-only memory (CD-ROM) and includes program code, and may run on a terminal device such as a personal computer. However, the program product in the present invention is not limited thereto. In this specification, the readable storage medium may be any tangible medium including or storing a program, and the program may be used by or used in combination with an instruction execution system, an apparatus, or a device.

The program product may use any combination of one or more readable media. The readable medium may be a computer-readable signal medium or a computer-readable storage medium. The readable storage medium may be, for example, but is not limited to, an electric, magnetic, optical, electromagnetic, infrared, or semi-conductive system, apparatus, or device, or any combination thereof. More specific examples of the readable storage medium (a non-exhaustive list) include: an electrical connection having one or more wires, a portable computer magnetic disk, a hard disk, a random access memory (RAM), a read-only memory (ROM), an erasable programmable read-only memory (EPROM) or flash memory, an optical fiber, a compact disc read-only memory (CD-ROM), an optical storage device, a magnetic storage device, or any appropriate combination thereof.

The computer-readable signal medium may include a data signal being in a baseband or transmitted as a part of a carrier, which carries readable program code. The propagated data signal may be in a plurality of forms, including but not limited to, an electromagnetic signal, an optical signal, or any appropriate combination thereof. The readable signal medium may alternatively be any readable medium other than the readable storage medium. The readable medium may be configured to transmit, propagate, or transmit a program used by or used in combination with an instruction execution system, an apparatus, or a device.

The program code included in the readable medium may be transmitted by using any appropriate medium, including but not limited to, a wireless medium, a wired medium, an optical cable, radio frequency (RF) or the like, or any appropriate combination thereof.

The program code used for performing the operations of the present disclosure may be written by using one or more programming languages or a combination thereof. The programming languages include an object-oriented programming language such as Java and C++, and also include a conventional procedural programming language such as "C" or similar programming languages. The program code may be completely executed on a user computing device, partially executed on a user device, executed as an independent software package, partially executed on a user computing device and partially executed on a remote computing device, or completely executed on a remote computing device or server. In a case involving a remote computing device, the remote computing device may be connected to a user computing device through any type of network including a LAN or a WAN, or may be connected to an external computing device (for example, through the Internet by using an Internet service provider).

In addition, the foregoing accompanying drawings are only schematic illustrations of the processes included in the method according to exemplary embodiments of the present disclosure, and are not intended to be limiting. It is easily understood that the processes illustrated in the foregoing accompanying drawings do not indicate or define the chronological order of these processes. In addition, it is also easily understood that these processes may be performed, for example, synchronously or asynchronously in a plurality of modules. The display device and the display panel thereof provided in the embodiment of the present disclosure are described in detail above. The principles and implementations of the present disclosure are described through specific examples in this specification, and the descriptions of the embodiments are only intended to help understand the technical solutions and core ideas of the present disclosure. Meanwhile, a person of skilled in the art may make modifications to the specific implementations and application scopes according to the ideas of the present disclosure. In conclusion, the content of the specification should not be construed as a limitation to the present disclosure.

What is claimed is:

1. A mobility detection method, applicable to a display device and comprising following steps:
   using a first predetermined number of consecutive picture frames as an adjustment group, selecting a picture frame from the adjustment group and denoting the picture frame as a detection frame, and denoting the picture frames in the adjustment group except the detection frame as adjustment frames;
   extending a frame idle time of the detection frame by a predetermined increment time, so that the frame idle time of the detection frame is greater than a predetermined detection time threshold;
   reducing a frame idle time of each of the adjustment frames by a predetermined decrement time, wherein a sum of the predetermined decrement times of the adjustment frames is equal to the predetermined increment time; and
   detecting, in a frame idle phase of the detection frame, mobility information of at least one row of sub-pixel points of the display device.

2. The mobility detection method as claimed in claim 1, wherein after the using a first predetermined number of consecutive picture frames as an adjustment group, selecting a picture frame from the adjustment group and denoting the picture frame as a detection frame, and denoting the picture frames in the adjustment group except the detection frame as adjustment frames, and before the extending a frame idle time of the detection frame by a predetermined increment time, so that the frame idle time of the detection frame is greater than a predetermined detection time threshold, the method further comprises a following step:
   caching a second predetermined number of consecutive picture frames.

3. The mobility detection method as claimed in claim 2, wherein before the using a first predetermined number of consecutive picture frames as an adjustment group, and selecting a picture frame from the adjustment group as a detection frame, the method further comprises following steps:
   acquiring a current frame rate of the display device; and
   determining the first predetermined number according to the frame rate.

4. The mobility detection method as claimed in claim 3, wherein the determining the first predetermined number according to the frame rate comprises following steps:
   determining an average frame idle time according to the frame rate;
   determining a first difference and a second difference, wherein the first difference is a difference between the average frame idle time and a predetermined idle time, and the second difference is a difference between the predetermined detection time threshold and the average frame idle time; and
   determining the first predetermined number according to the first difference and the second difference.

5. The mobility detection method as claimed in claim 1, wherein before the using a first predetermined number of consecutive picture frames as an adjustment group, and selecting a picture frame from the adjustment group as a detection frame, the method further comprises following steps:
   acquiring a current frame rate of the display device; and
   determining the predetermined increment time according to the frame rate.

6. The mobility detection method as claimed in claim 5, wherein the determining the predetermined increment time according to the frame rate comprises following steps:
   determining an average frame idle time according to the frame rate;
   determining the predetermined increment time according to a difference between the predetermined detection time threshold and the average frame idle time.

7. The mobility detection method as claimed in claim 5, wherein the determining the predetermined increment time according to the frame rate comprises a following step:
   determining the predetermined increment time according to a linear positive correlation between the frame rate and the predetermined increment time.

8. A mobility detection apparatus, applicable to a display device and comprising:
   a preprocessing module configured to use a first predetermined number of consecutive picture frames as an adjustment group, select a picture frame from the adjustment group and denote the picture frame as a detection frame, and denote the picture frames in the adjustment group except the detection frame as adjustment frames;
   a first adjustment module configured to extend a frame idle time of the detection frame by a predetermined increment time, so that the frame idle time of the detection frame is greater than a predetermined detection time threshold;

a second adjustment module configured to reduce a frame idle time of each of the adjustment frames by a predetermined decrement time, wherein a sum of the predetermined decrement times of the adjustment frames is equal to the predetermined increment time; and an information detection module configured to detect, in a frame idle phase of the detection frame, mobility information of at least one row of sub-pixel points of the display device.

9. The mobility detection apparatus as claimed in claim 8, wherein the mobility detection apparatus further comprises:

a frame caching module, configured to cache a second predetermined number of consecutive picture frames.

10. The mobility detection apparatus as claimed in claim 9, wherein the mobility detection apparatus further comprises:

a frame rate acquisition module, configured to acquire a current frame rate of the display device;

a frame number determination module, configured to determine the first predetermined number according to the frame rate.

11. The mobility detection apparatus as claimed in claim 10, wherein the frame number determination module further comprises:

a time determination unit, configured to determine an average frame idle time according to the frame rate;

a difference determination unit, configured to determine a first difference and a second difference, wherein the first difference is a difference between the average frame idle time and a predetermined idle time, and the second difference is a difference between the predetermined detection time threshold and the average frame idle time; and a frame number determination unit, configured to determine the first predetermined number according to the first difference and the second difference.

12. The mobility detection apparatus as claimed in claim 8, wherein the mobility detection apparatus further comprises:

a frame rate acquisition module, configured to acquire a current frame rate of the display device;

an increment determination module, configured to determine the predetermined increment time according to the frame rate.

13. The mobility detection apparatus as claimed in claim 12, wherein the increment determination module further comprises:

a time determination unit, configured to determine an average frame idle time according to the frame rate;

an increment determination unit, configured to determine the predetermined increment time according to a difference between the predetermined detection time threshold and the average frame idle time.

14. The mobility detection apparatus as claimed in claim 12, wherein the increment determination module further comprises:

an increment calculation unit, configured to determine the predetermined increment time according to a linear positive correlation between the frame rate and the predetermined increment time.

15. A computer device, comprising:
one or more processors;
a memory; and one or more applications stored in the memory and configured to be executed by the processors to perform following steps:

using a first predetermined number of consecutive picture frames as an adjustment group, selecting a picture frame from the adjustment group and denoting the picture frame as a detection frame, and denoting the picture frames in the adjustment group except the detection frame as adjustment frames;

extending a frame idle time of the detection frame by a predetermined increment time, so that the frame idle time of the detection frame is greater than a predetermined detection time threshold;

reducing a frame idle time of each of the adjustment frames by a predetermined decrement time, wherein a sum of the predetermined decrement times of the adjustment frames is equal to the predetermined increment time; and detecting, in a frame idle phase of the detection frame, mobility information of at least one row of sub-pixel points of the display device.

16. The computer device as claimed in claim 15, wherein after the using a first predetermined number of consecutive picture frames as an adjustment group, selecting a picture frame from the adjustment group and denoting the picture frame as a detection frame, and denoting the picture frames in the adjustment group except the detection frame as adjustment frames, and before the extending a frame idle time of the detection frame by a predetermined increment time, so that the frame idle time of the detection frame is greater than a predetermined detection time threshold, the method further performs:

caching a second predetermined number of consecutive picture frames.

17. The computer device as claimed in claim 16, wherein before the using a first predetermined number of consecutive picture frames as an adjustment group, and selecting a picture frame from the adjustment group as a detection frame, the method further performs:

acquiring a current frame rate of the display device; and
determining the first predetermined number according to the frame rate.

18. The computer device as claimed in claim 17, wherein the determining the first predetermined number according to the frame rate, the processor performs following steps:

determining an average frame idle time according to the frame rate;

determining a first difference and a second difference, wherein the first difference is a difference between the average frame idle time and a predetermined idle time, and the second difference is a difference between the predetermined detection time threshold and the average frame idle time; and determining the first predetermined number according to the first difference and the second difference.

19. The mobility detection method as claimed in claim 1, wherein before the using a first predetermined number of consecutive picture frames as an adjustment group, and selecting a picture frame from the adjustment group as a detection frame, the processor performs following steps:

acquiring a current frame rate of the display device; and
determining the predetermined increment time according to the frame rate.

20. The mobility detection method as claimed in claim 19, wherein the determining the predetermined increment time according to the frame rate, the processor performs following steps:

determining an average frame idle time according to the frame rate;

determining the predetermined increment time according to a difference between the predetermined detection time threshold and the average frame idle time.

* * * * *